(12) United States Patent
Weichmann et al.

(10) Patent No.: US 8,416,832 B2
(45) Date of Patent: Apr. 9, 2013

(54) SWITCHABLE DUAL WAVELENGTH SOLID STATE LASER

(75) Inventors: Ulrich Weichmann, Aachen (DE);
Jaione Bengoechea Apezteguia, Aachen (DE); Holger Moench, Vaals (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 12/672,553

(22) PCT Filed: Aug. 12, 2008

(86) PCT No.: PCT/IB2008/053222
§ 371 (c)(1),
(2), (4) Date: Feb. 8, 2010

(87) PCT Pub. No.: WO2009/022291
PCT Pub. Date: Feb. 19, 2009

(65) Prior Publication Data
US 2012/0128023 A1    May 24, 2012

(30) Foreign Application Priority Data
Aug. 16, 2007 (EP) .................... 07114421

(51) Int. Cl.
*H01S 3/08* (2006.01)

(52) U.S. Cl.
USPC ........................... 372/106; 372/10

(58) Field of Classification Search ............. 372/10, 372/106
See application file for complete search history.

(56) References Cited

U.S. PATENT DOCUMENTS

| 4,167,712 | A | 9/1979 | Esterowitz et al. |
|---|---|---|---|
| 4,441,186 | A | 4/1984 | Erickson |
| 6,028,870 | A | 2/2000 | Deutsch et al. |
| 6,078,606 | A | 6/2000 | Naiman et al. |
| 6,490,309 | B1 | 12/2002 | Okazaki et al. |
| 2001/0022566 | A1 | 9/2001 | Okazaki |
| 2003/0035447 | A1* | 2/2003 | Scheps ............. 372/21 |
| 2006/0280208 | A1 | 12/2006 | Baev et al. |
| 2007/0189343 | A1* | 8/2007 | Seelert et al. ........ 372/22 |

FOREIGN PATENT DOCUMENTS
JP   2004165396 A   6/2004

OTHER PUBLICATIONS

Danger et al: "Pulsed Laser Action of Pr:GdLiF4 at Room Temperature"; Applied Physics B. Photo-Physics and Chemistry, vol. B57, No. 3, pp. 139-241.

* cited by examiner

*Primary Examiner* — Yuanda Zhang
(74) *Attorney, Agent, or Firm* — David Zivan; Mark L. Beloborodov

(57) ABSTRACT

The present invention relates to a switchable dual wavelength solid state laser with a solid state gain medium (1) which is selected to emit optical radiation at a first wavelength with a first polarization and of at least a second wavelength with a second polarization different from said first polarization when optically or electrically pumped. A polarizing device (7) is arranged within the laser cavity, said polarizing device (7) being adjustable at least between said first and said second polarization. The two end mirrors (2, 3) of the laser cavity are designed to allow lasing of the solid state laser at the first wavelength when the polarizing device (7) is adjusted to the first polarization, and to allow lasing of the solid state laser at the second wavelength when the polarizing device (7) is adjusted to the second polarization. The proposed solid state laser allows an easy switching between two emission wavelengths.

6 Claims, 4 Drawing Sheets

SWITCHABLE DUAL WAVELENGTH SOLID STATE LASER

FIELD OF THE INVENTION

The present invention relates to a solid state laser with switchable wavelength, which at least comprises a solid state gain medium arranged between two resonator end mirrors of a laser cavity, said solid state gain medium emitting optical radiation at several wavelengths when optically or electrically pumped.

The inherent high radiance of lasers makes them an ideal candidate as the light source for all applications with high optical demands. Once lasers emitting in blue, green and red are available, they can e.g. replace UHP lamps as the light source in projection systems. The lack of integrated laser sources in the green wavelength region has until now hindered the widespread use of lasers for display or illumination applications. Nowadays used laser sources for the green wavelength region rely on frequency conversion either by upconversion or by second harmonic generation of an infrared laser source. An alternative to upconversion or second harmonic generation from the infrared wavelength region is the frequency conversion of blue laser sources just like in the case of the well-known dye lasers or the Nd:YAG laser for the infrared. With the recent development of GaN-based laser diodes for the blue-violet region this scheme becomes attractive for all-solid-state devices at visible wavelengths. In such a solid state laser device an appropriate solid state gain medium is optically pumped by a GaN-based laser diode in order to emit laser radiation in the blue, green or red wavelength region.

BACKGROUND OF THE INVENTION

Appropriate solid state gain media for such a device must have absorption lines in the blue-violet wavelength region. Different crystalline host materials doped with rare earth ions have been already proposed as gain media for such solid state laser devices. The $Pr^{3+}$-ion is of great interest in this context since it shows absorption at the typical emission wavelength of GaN-laser diodes and can convert this radiation into laser emission at blue, green, red and orange wavelengths.

U.S. Pat. No. 6,490,309 B1 discloses a solid state laser device in which a $Pr^{3+}$ doped crystal is optically pumped by a GaN-based laser diode. The document proposes different $Pr^{3+}$-doped crystals to obtain laser emission from $Pr^{3+}$ at several visible wavelengths. The exemplary embodiments shown in this document are based on $Pr^{3+}$ doped $LiYF_4$ (YLF) crystals. Furthermore, laser emission of $Pr^{3+}$ is reported to be obtained from the following hosts $BaY_2F_8$, $Ba(Y,Yb)_2F_8$, $LaF_3$, $Ca(NbO_3)_2$, $CaWO_4$, $SrMoO_4$, $YAlO_3$, $Y_3Al_5O_{12}$, $Y_2SiO_5$, $YP_5O_{14}$, $LaP_5O_{14}$, $LuAlO_3$, $LaCl_3$, $LaBr_3$, $PrBr_3$, $YVO_4$ and $GdVO_4$. The solid state laser of this document is designed to work at only one of the several possible wavelengths emitted by the Pr-doped crystals.

SUMMARY OF THE INVENTION

It is an object of the present invention to provide a solid state laser which can easily be switched between two different emission wavelengths.

The object is achieved with a solid state laser according to claim 1. Advantageous embodiments of this solid state laser are subject matter of the dependent claims or are described in the subsequent portion of the description.

The proposed solid state laser comprises a solid state gain medium arranged between two resonator end mirrors of a laser cavity. The solid state gain medium is selected to emit optical radiation at a first wavelength with a first polarization and of at least a second wavelength with a second polarization different from said first polarization when optically or electrically pumped. The solid state laser further comprises a polarizing device which is arranged within the laser cavity. The polarizing device is adjustable at least between said first and said second polarization, i.e. to allow in a first adjustment state only transmission of optical radiation having said first polarization and to allow in a second adjustment state only transmission of optical radiation having said second polarization. The two end mirrors of the laser cavity are designed, i.e. comprise an appropriate wavelength dependent reflectivity, to allow lasing of the solid state laser at said first wavelength when the polarizing device is in the first adjustment state and to allow lasing of the solid state laser at said second wavelength when the polarizing device is in the second adjustment state.

With the proposed solid state laser the emission wavelength of this laser can easily be switched between the first and the second wavelength by switching or adjusting the polarizer device between the two polarizations. This may be performed manually, for example by manually rotating a polarizer element from first polarization to the second polarization. Such rotation of a polarizer element may also be performed by an appropriate actuator, for example an electro motor. The polarizing device for a polarization control inside of the laser cavity is not limited to such a simple polarizer element. For example, also a combination of a Pockels-cell with a polarizing beam splitter can be placed inside of the laser cavity to form the polarizing device. This allows for electric switching between the different polarizations by appropriate control of the voltage applied to the Pockels-cell. It is clear for the skilled person, that also other means of polarization control can be placed inside of the laser cavity to perform the required polarization control without departing from the scope of the invention.

When using a gain medium which emits optical radiation at more than two different wavelengths with a sufficiently high intensity to allow lasing with appropriate high reflectivity end mirrors, the end mirrors are preferably designed such that laser emission at other than the first and second wavelengths is inhibited. This is achieved by designing the end mirrors to have a sufficiently low reflection coefficient at these undesired wavelengths. The end mirrors of the laser cavity are preferably dielectrically coated mirrors, in order to allow the required design for the proposed wavelength switching of the laser.

The solid state gain medium, which must provide optical anisotropy for the desired polarization effect, is preferably based on a doped crystal of at least biaxial symmetry. Such doped crystals, which are for example doped with rare earth elements, have been discovered to show the required different polarization at different emitted wavelengths. Preferably, a Pr doped crystal is used as the gain medium of the proposed solid state laser. As already outlined in the introductory portion, Pr doped crystals emit optical radiation at several visible wavelengths which are interesting for applications in the visible wavelength range, in particular for projection applications. Laser emission of such a Pr doped crystal has been already reported in six different wavelength regions ranging from 522 to 907 nm. The host crystal for the gain medium may be selected for example from the crystals $LiYF_4$, $LiLuF_4$, $KYF_4$, $YAlO_3$, $GdAlO_3$, $LaF_3$, $LaBr_3$, or $BaY_2F_8$. Such a Pr doped gain medium is placed between the two resonator mirrors that form the optical cavity. The Pr doped gain medium can be optically pumped for example by a blue laser source since Pr doped crystals show strong absorption in this wavelength region. An alternative is to optically pump such a gain medium with infrared radiation via upconversion. In this case, preferably the known co-doping of the gain medium by Yb-ions is performed which allows a high efficiency of the upconversion process. Such a Pr doped gain medium emits optical radiation with different polarization at different wavelengths, for example in the red at 640 nm and in the green at 522 nm. When designing the end mirrors with an appropriate wavelength dependent reflectivity, for example with a high reflectivity at 640 nm and at 522 nm, the switching of the lasing wavelength of the laser can be achieved between 640 nm and 522 nm only by varying the polarization of the polarization device inside of the laser cavity appropriately, i.e. between a first polarization of the optical radiation at 640 nm and a second polarization of the optical radiation at 522 nm which is perpendicular to the first polarization. Nevertheless, also a switching between other two wavelengths corresponding to the emission lines of the Pr doped crystal is possible as far as the optical radiation of the two wavelengths is emitted with different polarizations and the end mirrors are designed appropriately.

It should also be clear from the above, that the principle of the proposed solid state laser is not dependent on the design of the laser cavity. It is for example also possible to use a intra-cavity pumping of the gain medium, i.e. the solid state gain medium is placed inside the same laser cavity as the pump laser. Furthermore, the solid state gain medium may also be arranged on a common substrate together with the pump laser, for example a GaN based pump laser. It is also possible to arrange several of such solid state lasers on a common substrate, for example in order to provide an array of laser light sources.

In one embodiment, a RGB (R: red, G: green, B: blue) laser light source is realized in which the proposed solid state laser device provides the red and green light by switching between these two wavelengths in a required sequential manner. The blue laser light source can be realized for example with a known GaN laser diode emitting in the blue wavelength region.

These and other aspects of the invention will be apparent from and elucidated with reference to the embodiments described herein after.

BRIEF DESCRIPTION OF THE DRAWINGS

The proposed solid state laser is described in the following by way of examples in connection with the accompanying figures without limiting the scope of protection as defined by the claims. The figures show:

DETAILED DESCRIPTION OF EMBODIMENTS

Figure 1:
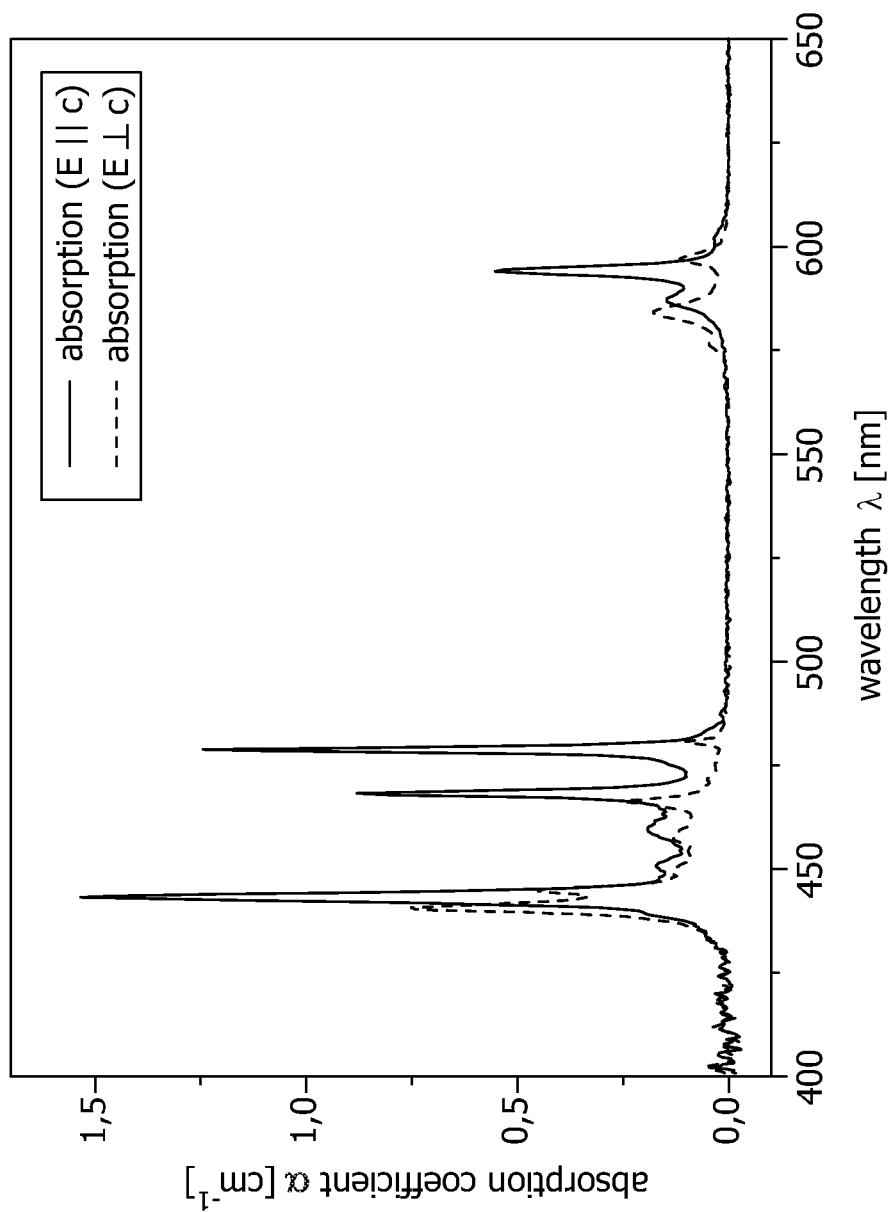
FIG. 1 ground state absorption lines of $LiYF_4$:Pr at room temperature for two different polarizations of the pump laser.

Some of known gain media for solid state lasers emit optical radiation at different wavelengths with different polarization when optically pumped. In particular in crystals of biaxial symmetry, for example $Pr^{3+}$ exhibits a strong polarization dependence of absorption and emission. This is shown in FIG. 1 for a ground state absorption of $LiYF_4$:Pr. In this figure the absorption coefficient is depicted for the electrical field E of the pump laser parallel to the crystallographic c-axis c of the gain medium on the one hand and perpendicular to this crystallographic c-axis on the other hand. The doping level of Pr in the crystal was $c_{Pr}=0.2\%$.

Figure 2:
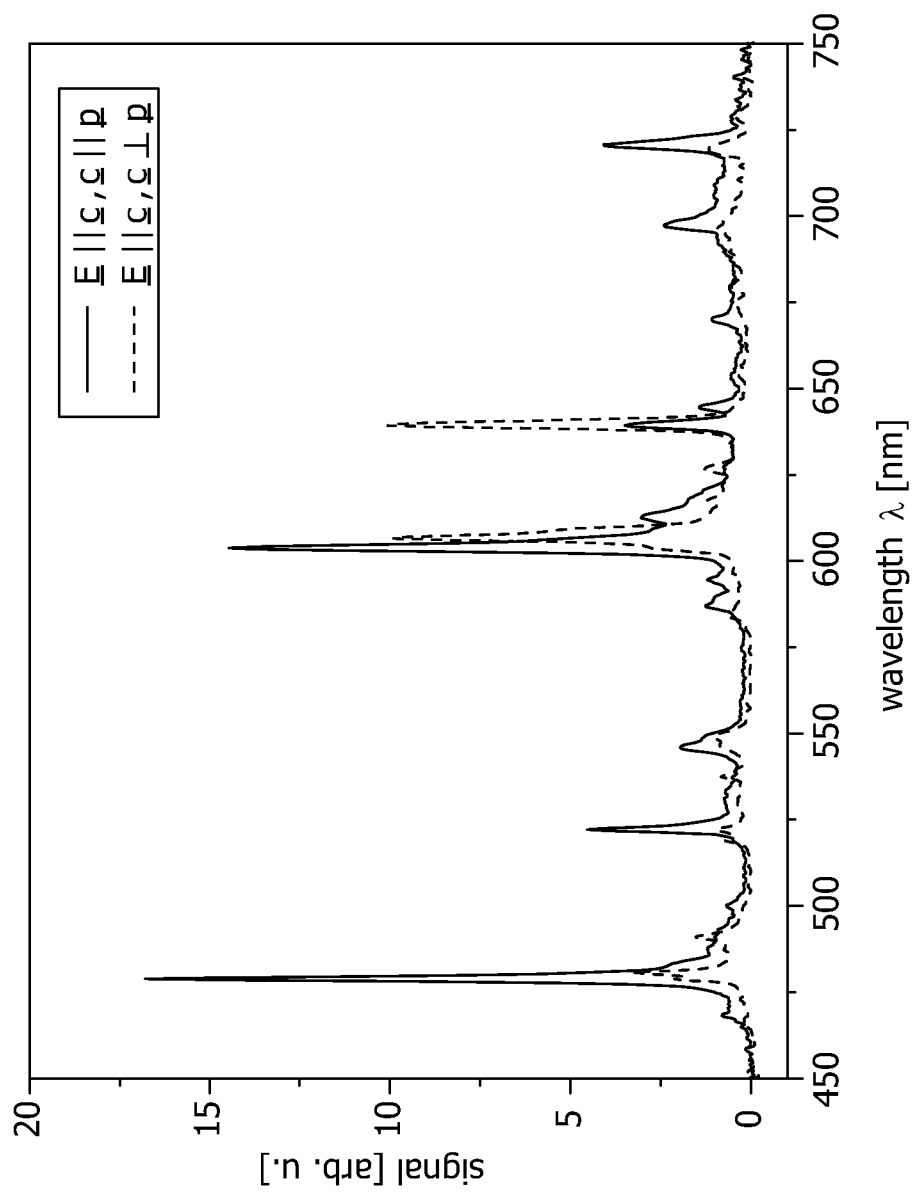
FIG. 2 polarized emission of $LiLuF_4$:Pr, pumped by polarized laser radiation at 443 nm.

FIG. 2 shows the emission of $LiLuF_4$:Pr for the case of the electrical field E of the pump laser parallel to the crystallographic c-axis c of the crystal. This figure shows a polarization dependent emission of different wavelengths corresponding to the different emission lines of the crystal, like in the case of the emission peaks at 522 nm and at 640 nm. The radiation of emission peak at 522 nm has a polarization parallel to the crystallographic c-axis c of the crystal whereas the emission at 640 nm has a polarization perpendicular to this crystallographic c-axis. FIG. 2 is based on a pump laser radiation at 443 nm, with the electrical field E of the laser being parallel to the crystallographic c-axis.

Due to the above polarization dependence of the emission at different wavelengths, the inventors of the proposed solid state laser recognized that such a gain medium might allow a switching between wavelengths of different polarization by appropriately designing the laser.

Figure 3:
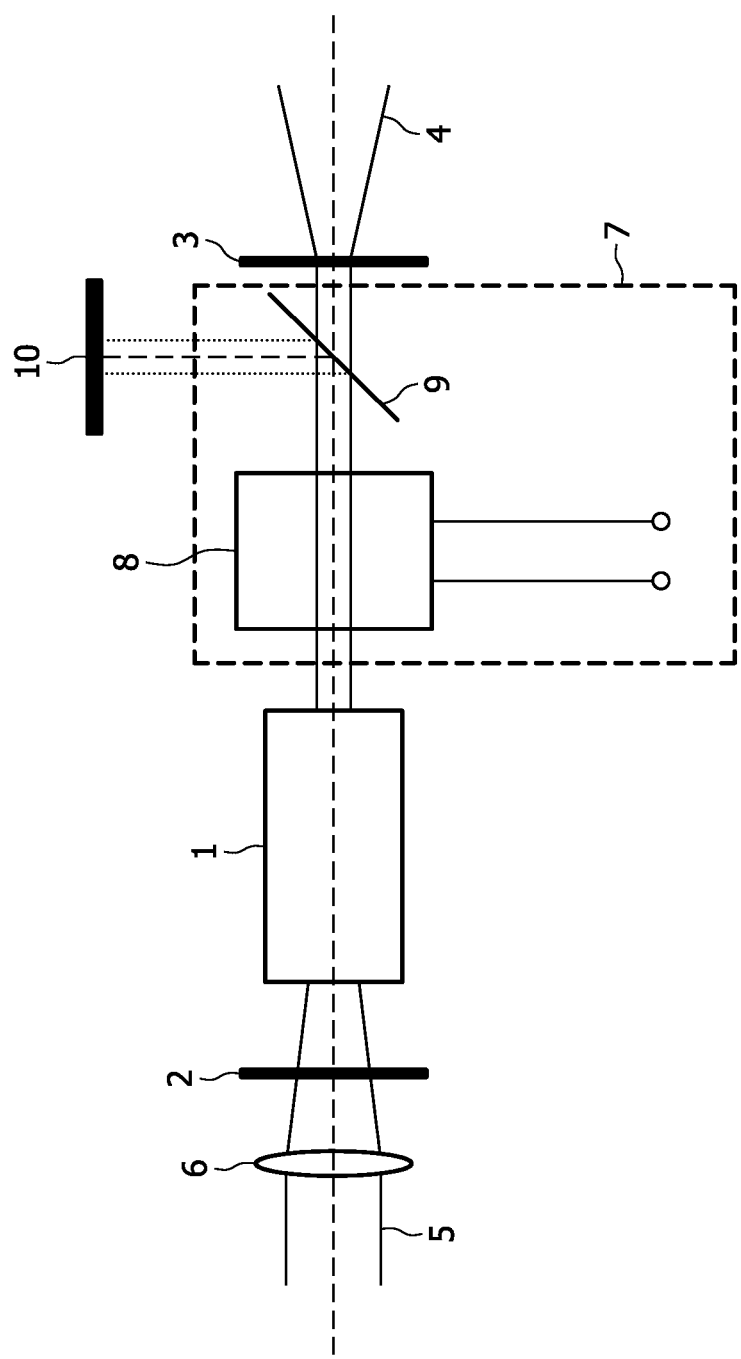
FIG. 3 a schematic view of an example of the proposed solid state laser.

FIG. 3 shows an example of a properly designed solid state laser having such a gain medium, i.e. a $Pr:LiLuF_4$ crystal 1, for switching between red and green wavelengths. The schematic setup of this solid state laser comprises the laser crystal 1 arranged between two resonator end mirrors 2, 3 which form the laser cavity. The second end mirror 3 is the outcoupling mirror for the laser emission 4. The pump radiation 5 is coupled into the laser crystal 1 by a coupling optics 6 through the first end mirror 2 as shown in FIG. 3. In order to allow the switching between red and green emission lines of the Pr doped crystal 1, the resonator end mirrors 2, 3 have to allow lasing at the green and red transition simultaneously while suppressing the cyan (491 nm) and orange (603 to 606 nm) transitions. Therefore, the high reflectivity resonator mirror 2 in the left side in FIG. 3 must have a high transmission for the wavelength of the pump laser and for the cyan wavelength, e.g. T>80% at 420 to 500 nm, a high reflectivity for the green wavelength, e.g. R>90% at 500 to 570 nm, a high transmission in the orange wavelength range, e.g. T>60% between 580 and 620 nm, and high reflectivity again for the red wavelength region, e.g. R>90% at 630 to 660 nm. The second end mirror used as the outcoupling mirror will have similar properties with the exception that a certain transmission must be allowed at the green and red laser wavelengths for outcoupling, e.g. T=2% in the wavelength ranges of 510 to 530 nm and 630 to 660 nm.

Figure 4:
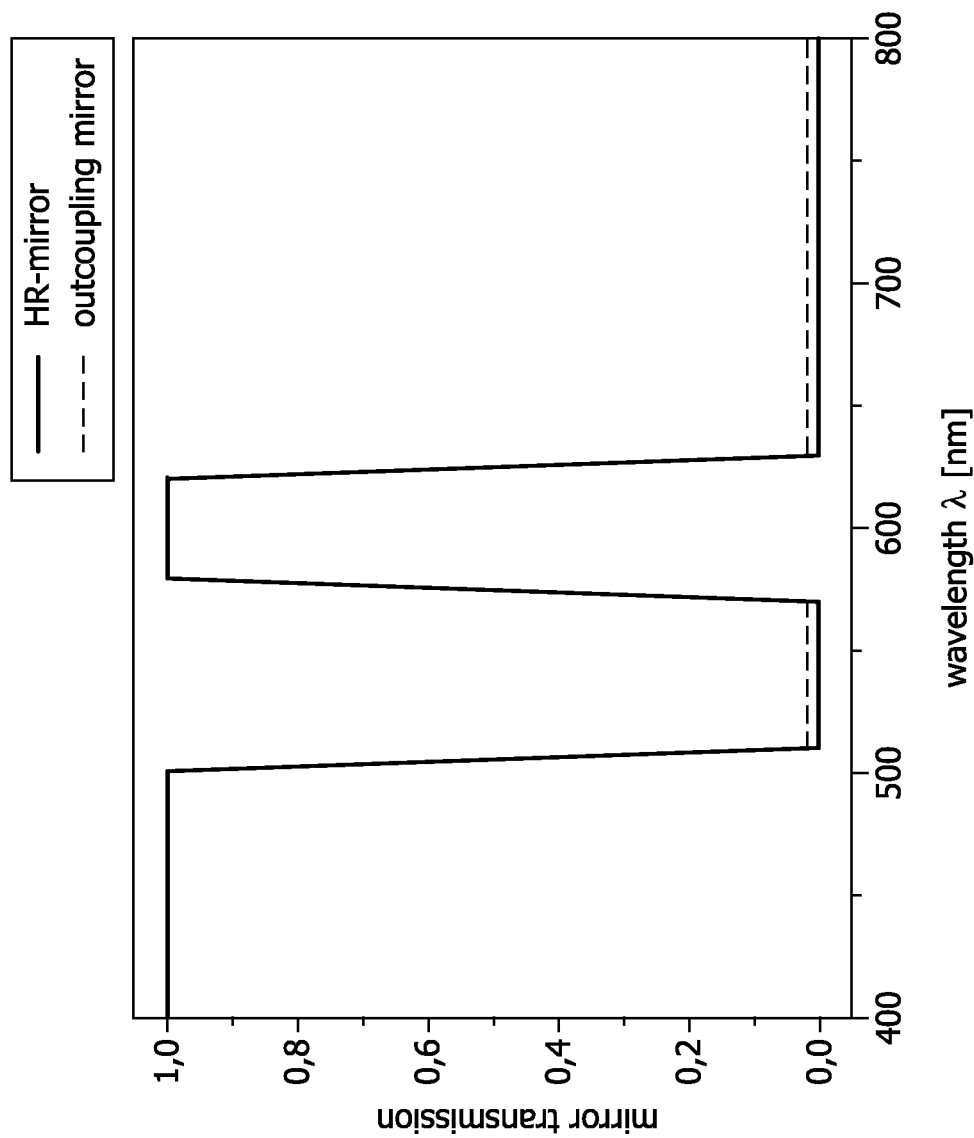
FIG. 4 an example of the reflectivity of the two end mirrors of the laser cavity according to one embodiment of the proposed solid state laser.

FIG. 4 shows an example of the mirror transmission of the two end mirrors 2, 3 in dependence of the wavelength. In this figure, the first resonator end mirror 2 has a high reflectivity for the red and green wavelength near 100%, whereas the outcoupling mirror 3 in these wavelength ranges has still a small transmission near 2%.

In order to allow a switching between the red and green wavelengths, a polarization control 7 (see FIG. 3) is arranged between the laser crystal 1 and one of the end mirrors 2, 3 inside the laser cavity. The simplest case of such a polarization control 7 inside the cavity is a polarizer that can be rotated around the resonator optical axis with respect to the crystallographic c-axis of the $Pr:LiLuF_4$ crystal 1. With the electric field E parallel to the c-axis of the crystal, like in the diagram of FIG. 2, setting the polarizer axis p parallel to the c-axis c of the crystal will allow for the green transition to lase and will suppress the red transition. Rotating the polarizer by 90° sets the axis p orthogonal to c and therefore introduces losses for the green wavelength and allows lasing on the red transition. Since all Pr transitions of interest stem from the thermally coupled levels $^3P_{0-2}$ and $^1I_6$, the switching between emission wavelengths is fast and is not slowed down by the lifetime of the upper laser level.

Instead of a simple polarizer also a more elaborate version of a polarization control 7 can be realized as indicated in FIG. 3. In this case a Pockels-cell 8 is combined with a polarizing beam splitter 9, which deflects radiation with the wrong polarization out of the laser cavity to a beam dump 10. Other means of polarization control which are state of the art are nevertheless possible.

The solid state laser shown in the above embodiment allows easy and convenient switching between different emission wavelengths of a Pr$^+$ doped laser crystal. The proposed laser can be switched between green at 522 nm and red at 640 nm. Nevertheless also a switching between other emission lines of the laser crystal is possible by appropriately designing the end mirrors. The above two emission wavelengths are suitable for laser displays or projectors. Therefore, by using such a technology, advanced switchable laser setups like a projection light source are provided, in which some functionality of the projector optics, like the color wheel, are integrated into the laser source itself, leading to much simpler and compact projector setups in the future.

While the invention has been illustrated and described in detail in the drawings and forgoing description, such illustration and description are to be considered illustrative or exemplary and not restrictive, the invention is not limited to the disclosed embodiments. The different embodiments described above and in the claims can also be combined. Other variations to the disclosed embodiments can be understood and effected by those skilled in the art in practicing the claimed invention, from a study of the drawings, the disclosure and the appended claims. For example, the proposed setup is not limited to switching between red and green. Also other combinations are possible, like a switching between red and cyan and even between green-orange and red-orange. Also any modifications of the laser setup are possible. The bulk crystal depicted in FIG. 3 can also be in the form of a waveguide. A possible example is Pr:LiLuF$_4$ grown epitaxially on LiYF$_4$. The laser is not limited to optically pumped gain media.

In the claims, the word "comprising" does not exclude other elements or steps, and the indefinite article "a" or "an" does not exclude a plurality. The mere fact that measures are recited in mutually different dependent claims does not indicate that a combination of these measures can not be used to advantage. Any reference signs in the claims should not be construed as limiting the scope of these claims.

LIST OF REFERENCE SIGNS

1 Pr doped laser crystal
2 first resonator end mirror
3 second resonator end mirror
4 laser emission
5 pump radiation
6 coupling optics
7 polarization control
8 Pockels-cell
9 polarizing beam splitter
10 beam dump

The invention claimed is:

1. A solid state laser device with switchable wavelength, the device having a laser cavity and comprising:
   two resonator end mirrors disposed within the laser cavity;
   a solid state gain medium disposed between the resonator end mirrors, said solid state gain medium being selected to emit optical radiation at a first wavelength in a green wavelength region with a first polarization and at a second wavelength with a second polarization different from said first polarization, when optically or electrically pumped, and
   a polarizing device disposed within the laser cavity, said polarizing device being adjustable at least between said first and said second polarization, wherein the two resonator end mirrors implement lasing of the solid state laser at said first wavelength when the polarizing device is adjusted to the first polarization, and the two resonator end mirrors implement lasing at said second wavelength when the polarizing device is adjusted to the second polarization, wherein said solid state gain medium also emits optical radiation with at least one third wavelength different from said first and second wavelengths when optically or electrically pumped, and wherein said end mirrors inhibit lasing at said at least one third wavelength.

2. The solid state laser device according to claim 1, wherein said solid state gain medium is formed of a doped crystal of at least biaxial symmetry.

3. The solid state laser device according to claim 1, wherein said solid state gain medium is Pr doped.

4. The solid state laser device according to claim 1, wherein said polarizing device is a polarizer element rotatable around an optical resonator axis.

5. The solid state laser device according to claim 1, wherein said polarizing device comprises a Pockels-cell in combination with a polarizing beam splitter.

6. The solid state laser device according to claim 1, wherein the second wavelength is in a red wavelength region.

* * * * *